United States Patent [19]
Roberts

[11] 3,979,221
[45] Sept. 7, 1976

[54] WATER SYSTEM DELIMING APPARATUS
[75] Inventor: Melvin F. Roberts, Chicago, Ill.
[73] Assignee: Bloomfield Industries, Inc., Chicago, Ill.
[22] Filed: Feb. 28, 1975
[21] Appl. No.: 554,132

[52] U.S. Cl. .................................. 134/99; 134/171; 99/300
[51] Int. Cl.² ............................................ B08B 9/02
[58] Field of Search.......... 134/99, 103, 109, 166 R, 134/166 C, 171; 99/300

[56] References Cited
UNITED STATES PATENTS
| | | | |
|---|---|---|---|
| 1,149,164 | 8/1915 | Richter | 134/103 X |
| 1,678,089 | 7/1928 | Ullmann | 134/166 R X |
| 1,948,425 | 2/1934 | Mayberry | 99/300 X |
| 2,183,007 | 12/1939 | Buchhron | 134/99 X |

Primary Examiner—Robert L. Bleutge
Attorney, Agent, or Firm—Edward C. Threedy

[57] ABSTRACT

A portable apparatus for use in deliming conduits and containers and other devices utilizing a water supply in which deposits of lime occur during use, with the apparatus providing a directional valve structure in the water supply line and a reusable container of deliming solution, with the container having conduits providing quick connectors by which the container is readily attached to and detached from the directional valve in the water supply line of the apparatus requiring deliming.

7 Claims, 10 Drawing Figures

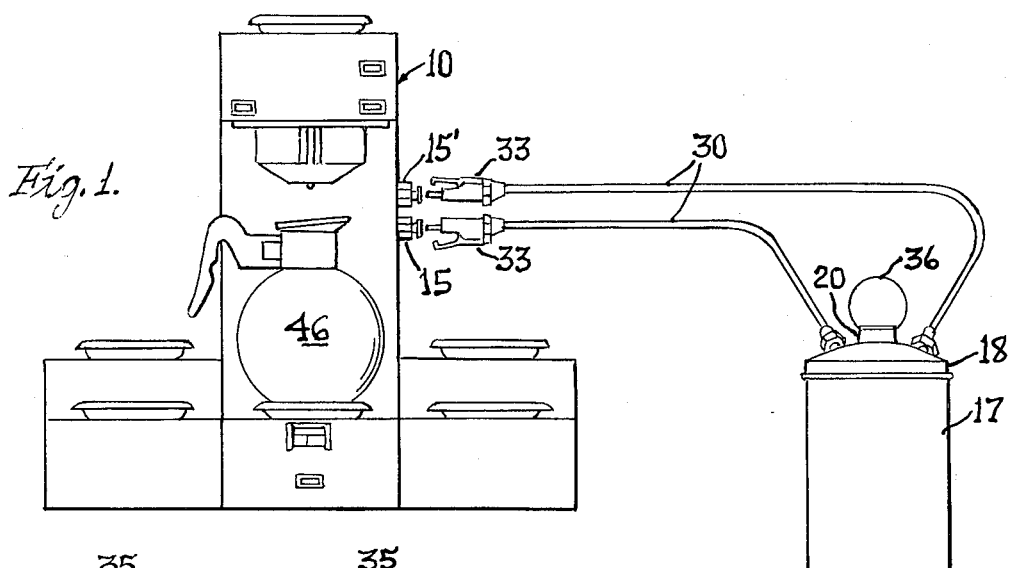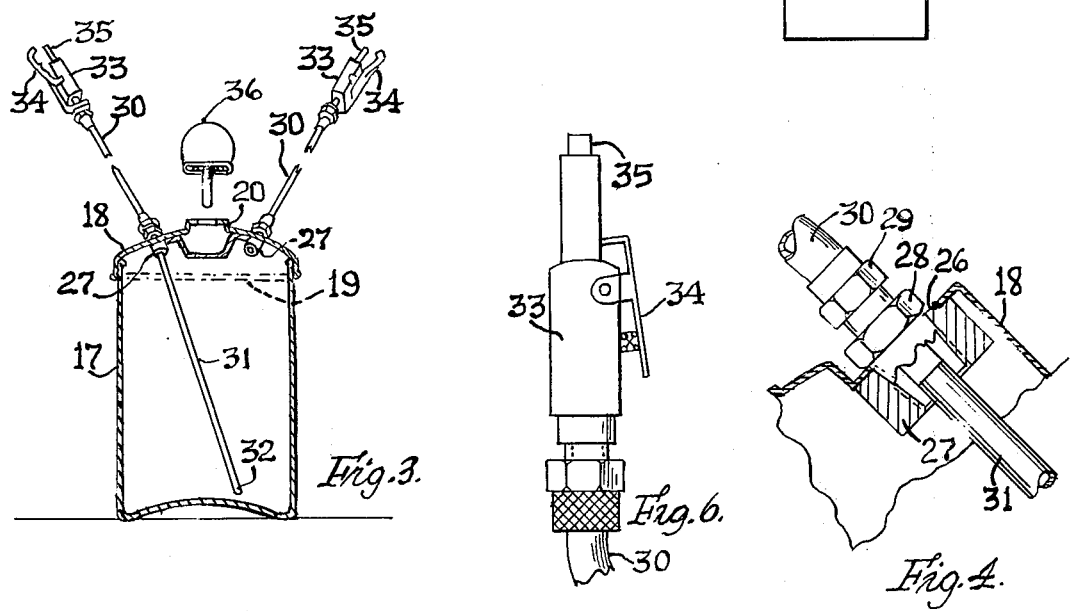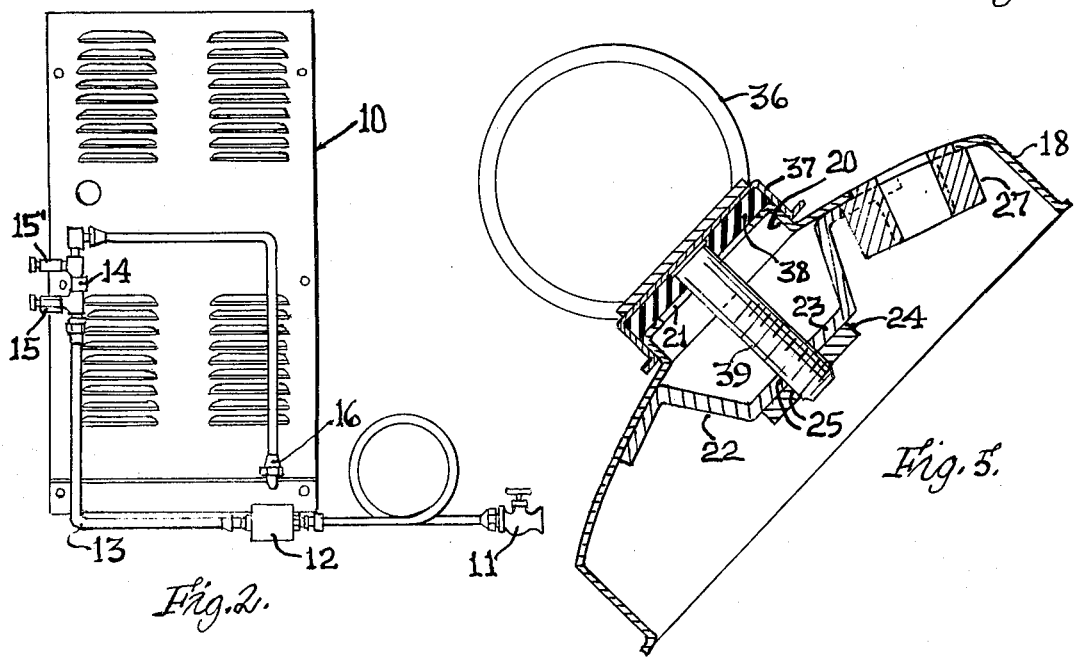

WATER SYSTEM DELIMING APPARATUS

SUMMARY OF THE INVENTION

There are presently in use many types of apparatuses, such as coffee brewing machines, that are connected directly into a water supply line. The mineral content of the water is such that a certain amount of lime is contained, causing lime deposits on the surfaces of the conduits, containers, sprayheads and other components of the apparatuses, causing them to misfunction.

The present invention is directed to an apparatus that is readily integrated into the liquid supply system of the machine, by which system may be flushed with a deliming solution without dismantling any components thereof. The apparatus of the present invention consists of a deliming solution tank having inlet and outlet hose connections which provide at their free ends quick connectors whereby they may be readily connected to suitable valve couplings which are and remain part of the existing water supply system for the apparatus.

GENERAL DESCRIPTION

The invention will be best understood by reference to the accompanying drawings in which there is shown the preferred form of embodiment, and in which:

FIG. 1 is a front view of a coffee brewing machine illustrating the method by which the deliming apparatus of the invention can be operatively attached thereto;

FIG. 2 is a side view of the coffee brewing machine illustrating the liquid conduits which make up part of the deliming apparatus of the invention;

FIG. 3 is a fragmentary detailed sectional view of the deliming apparatus of this invention;

FIG. 4 is a fragmentary detailed sectional view of a hose connection with the deliming tank;

FIG. 5 is a detailed sectional view of the upper portion of the delimer tank with removable cap thereon;

FIG. 6 is a plan view of the quick connector valve;

As shown in FIGS. 1 and 2, there is a coffee brewing machine 10 which has a normal water supply line system which consists of a water shut-off valve 11 and strainer 12 in an inlet conduit 13.

Figure 7:
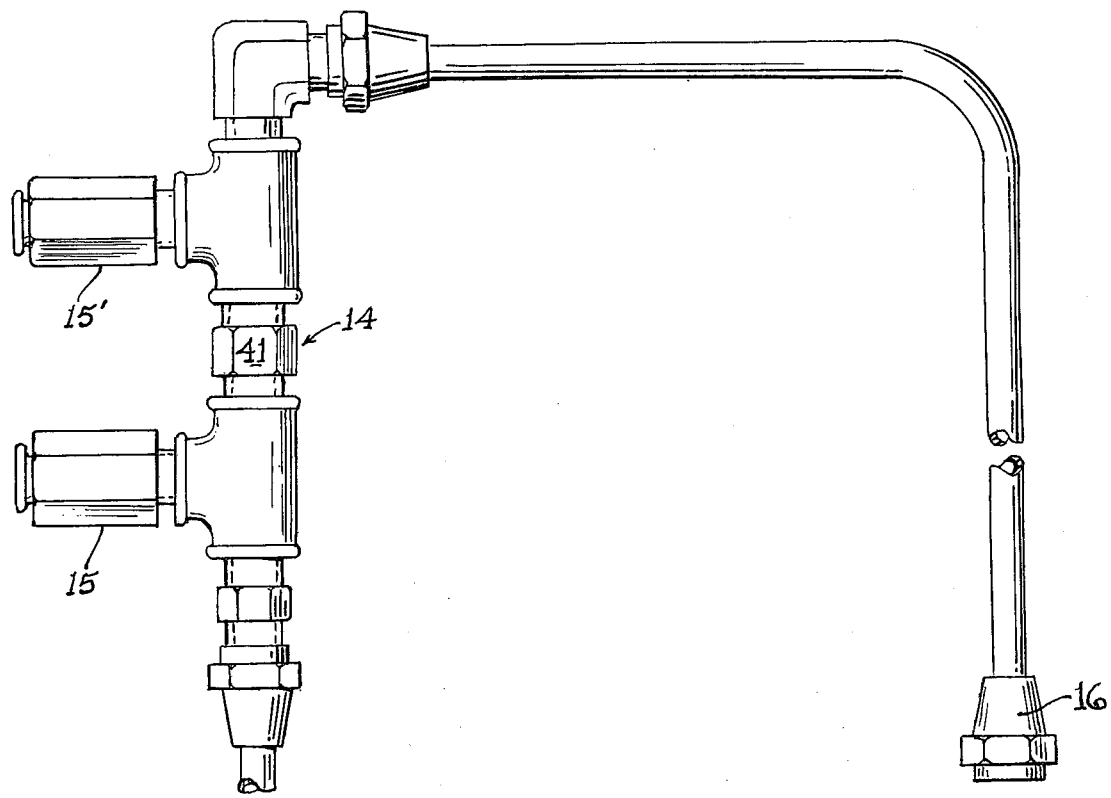
FIG. 7 is a fragmentary side elevational view of a portion of the external supply line for the apparatus.

In FIG. 7 the water inlet conduit 13 is shown as including a directional valve structure 14 and two valve couplings 15 and 15' between the strainer 12 and the conduit connector 16 which supplies the water into the interior of the coffee brewing machine 10. The valve couplings 15 and 15' are of any standard construction and of the type which are readily available on the market.

As shown in FIG. 3 there is provided an open tank 17 which is permanently closed by a cover 18 which is welded as at 19 to the wall of the tank 17 so as to permanently attach the same thereto. The cover 18 provides a raised neck 20 having an enlarged opening 21 formed therethrough. Within the tank 17 is a U-shaped bracket 22, the bight portion 23 of which is spaced away from the raised neck 20 of the tank 17. To the bight portion 23 of the bracket 22 there is mounted a reinforcing member 24 which, together with the bight portion 23, is provided with a center threaded opening 25. The cover 18 also provides to either side of the raised neck 20, circular openings 26. Within these openings 26 is placed a water-tight plug 27 which provides an external hose coupling 28 to which the threadable coupling 29 of a hose section 30 may be readily attached. One of the plugs 27, such as shown in FIG. 3, provides a connection with a tube 31 which provides an open end 32 adjacent to the bottom of the tank 17, as shown in FIG. 2. As shown in FIG. 6, the hose sections 30 each provide at their free ends a quick connector valve 33. These quick connector valves 33 include a spring-biased clamp 34 by which they may be readily attached to the couplings 15 and 15'. When the quick connector valves 33 are so attached to the couplings 15 and 15', the external valve stems 35 of each of the valves 33 will be depressed so as to open communication therethrough. These quick connector valves 33 are of a well-known construction and readily commercially available and, except for their inclusion as a component of the apparatus, make up no part of the present invention.

The tank 17 is provided with a cap 36 which provides a cup 37 which houses a sealing washer 38 which surrounds a threaded stem 39. The cup 37 is of such size as to fit upon the raised neck 20 of the cover 18 when the stem 39 is threaded into the aperture 25 of the bracket 22, as hereinbefore noted.

The elements heretofore described, including the tank 17, the hoses 30, as well as the quick connector valves 33, can be considered as a detachable secondary line system for the coffee brewing machine 10.

Figure 8:
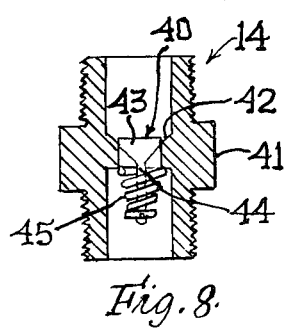
FIG. 8 is a detailed sectional view of the directional valve utilized in the invention.
Figure 9:
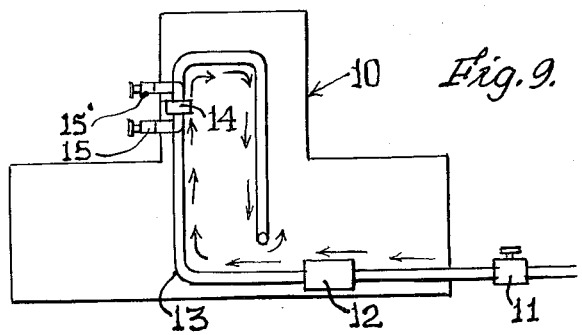
FIG. 9 is a schematic view showing the direction of water flow in the apparatus in normal use.

The directional valve structure 14 consists of a pressure relief valve 40, such as shown in FIG. 8, which is included as an integral part of a union 41 disposed between the couplings 15 and 15'. The relief valve 40 includes an internal valve seat 42 adapted to receive a valve head 43. The valve stem 44 is embraced by a coil spring 45, which in normal expansion seats the head 43 upon the valve seat 42. Depending on the size of the inlet conduit 13, the spring 45 will exert the known pressure upon the stem 44 so as to hold the valve in a closed position. In normal use, the flow of water through the supply system will have sufficient pressure to overcome the spring 45, open the valve and permit fluid flow therethrough directly into the apparatus as schematically shown in FIG. 9.

When the coffee brewing machine 10 is equipped with an external water supply line such as shown in FIGS. 1 and 2, the machine is conditioned to accept the deliming apparatus consisting of those components as shown in FIG. 3 and hereinbefore described, which may be referred to as "a secondary supply line system," whenever it is required to delime the apparatus.

In use, the cap 36 is removed from the delimer tank 17 and a measured amount of lime solvent may be placed into the tank 17. The tank 17 is then filled with cold water and the cap 36 is replaced so as to seal the tank 17. The secondary supply line system is then connected through the quick connector valves 33 to the valve couplings 15 and 15' as shown in FIGS. 1 and 2. When the deliming apparatus has been thus connected to the water supply system of the coffee brewing machine, the water supply entering through inlet conduit 13 will now pass through the valve connector 15 and by-pass the valve 40, passing through one of the hoses 30 into the tank 17 and out of the other hose 30 through the other valve coupling 15' into the coffee brewing machine.

Figure 10:
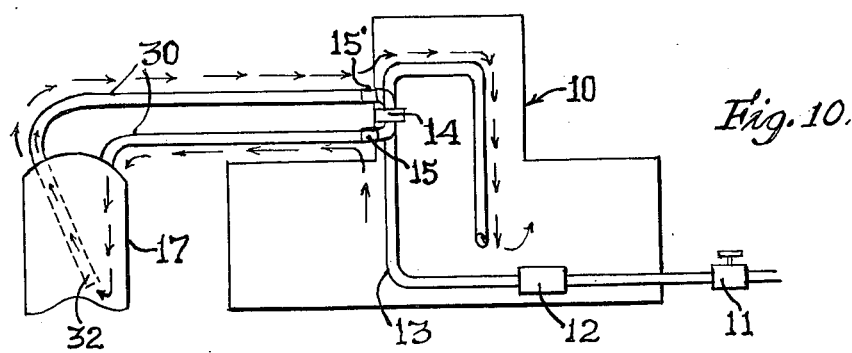
FIG. 10 is a schematic view showing the direction of water flow in the apparatus when the deliming apparatus is connected thereto and in operation.

The path of the water supply when the deliming apparatus is connected to the coffee brewing machine is such as indicated in FIG. 10. When the water supply passes through the inlet conduit 13 and through the valve coupling 15, it will decrease its pressure against the valve 40 sufficiently to permit the coil spring 45 to close the valve, preventing water from passing therethrough in either direction. Thus, the deliming solution of the tank 17 is prevented from reentering into the water supply system.

After the machine 10 has gone through a brewing cycle, the flush water will flow into a decanter 46, from which it can be discarded. The flushing cycle may be repeated as often as deemed necessary to effectively delime the brewing machine 10.

After the deliming operation is completed, the tank 17 is disconnected from the machine 10, and the brewing machine 10 can be then once again flushed with clear water prior to utilizing it again for brewing coffee. The pressure within the deliming tank 17 may be relieved by manually pressing one of the stems 35 of the quick connector valves 33, at which time the cap 36 may be removed, the tank 17 flushed out and in readiness for a subsequent operation.

From the foregoing it is thus apparent that there is provided a deliming apparatus which is readily connected into the water supply system of a machine by which such machine may be flushed with a lime solvent without requiring any dismantling of parts or internal disassembly.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A portable apparatus for deliming a device such as a coffee brewing machine utilizing in its normal operation a water supply system, comprising
    a. a water supply intake line provided by the device to be delimed,
    b. means in said intake line providing connections for a detachable secondary line system,
    c. a detachable secondary line system connectable into said intake line,
    d. a refillable sealable tank in said secondary line system for containing a lime solvent for introduction into said intake line,
    e. means detachably connecting said secondary line system and said tank in open communication to said intake line, with the lime solvent in said tank introduced under water pressure through said secondary line system into the apparatus, and
    f. a directional valve means in said secondary line system automatically operable by the difference in water pressure between said secondary line system and said intake line so as to cooperate with said last-named means for directing the water supply into and out of said tank prior to its introduction into the device to be delimed.

2. An apparatus for deliming a device as defined by claim 1, wherein said means in said intake line providing connections for a detachable secondary line system consists of a pair of couplings in said intake line normally closed so as to maintain said intake line in a closed system.

3. An apparatus for deliming a device as defined by claim 2, wherein said means provided by said secondary line system for detachably connecting it and said tank in open communication with said intake line comprises valve connectors cooperating with said couplings to open said intake line to said secondary line system whereby said solvent in said tank is introduced into said machine.

4. An apparatus for deliming a device as defined by claim 1, wherein said means provided by said secondary line system for detachably connecting it and said tank in open communication with said intake line, consists of valve connectors cooperating with said means in said intake line to open said intake line to said secondary line whereby said solvent in said tank is introduced into the machine.

5. An apparatus for deliming a device as defined by claim 1, wherein said tank provides a sealed inlet and outlet adapted to be connected with said intake line so that water passing therethrough will be caused to pass through said tank before introduction into said machine.

6. An apparatus for deliming a device as defined by claim 5, wherein said means in said intake line providing connections for a detachable secondary line system consists of a pair of couplings in said intake line normally closed so as to maintain said intake line in a closed system.

7. An apparatus for deliming a device as defined by claim 5, wherein said means provided by said secondary line system for detachably connecting it and said tank in open communication with said intake line, consists of valve connectors cooperating with said means in said intake line to open said intake line to said secondary line system whereby said solvent in said tank is introduced into the machine.

* * * * *